United States Patent
Mochizuki et al.

(10) Patent No.: US 7,046,603 B2
(45) Date of Patent: May 16, 2006

(54) INFORMATION STORAGE APPARATUS

(75) Inventors: Hideshi Mochizuki, Kawasaki (JP);
Takashi Masaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 317 days.

(21) Appl. No.: 09/767,163

(22) Filed: Jan. 22, 2001

(65) Prior Publication Data

US 2002/0039336 A1    Apr. 4, 2002

(30) Foreign Application Priority Data

Sep. 29, 2000    (JP)    ............................. 2000-299573

(51) Int. Cl.
*G11B 7/00*    (2006.01)

(52) U.S. Cl. .............. 369/53.18; 369/53.42; 369/30.24

(58) Field of Classification Search ............ 369/30.24, 369/30.26, 47.36, 47.38, 47.39, 47.44, 47.49, 369/45.5, 47.51, 33.26, 53.12, 53.18, 55.45, 369/53.5, 234, 235, 237
See application file for complete search history.

(56) References Cited

U.S. PATENT DOCUMENTS

| | | | |
|---|---|---|---|
| 4,417,288 A * | 11/1983 | Hattori et al. .............. | 369/268 |
| 5,151,637 A * | 9/1992 | Takada et al. .............. | 318/376 |
| 5,701,284 A * | 12/1997 | Lee .......................... | 369/53.18 |
| 5,715,157 A * | 2/1998 | Kuhn ......................... | 369/47.42 |
| 5,774,292 A * | 6/1998 | Georgiou et al. ......... | 369/47.29 |
| 5,831,945 A * | 11/1998 | Shinbori et al. .............. | 369/19 |
| 5,892,570 A * | 4/1999 | Stevens ........................ | 369/53 |
| 5,894,204 A * | 4/1999 | Kumita ......................... | 318/86 |
| 5,963,517 A * | 10/1999 | Nakagaki et al. ......... | 369/53.18 |
| 6,016,296 A * | 1/2000 | Kim .......................... | 369/53.18 |
| 6,118,742 A * | 9/2000 | Matsui et al. ............. | 369/47.48 |
| 6,122,234 A * | 9/2000 | Fujitani et al. ............. | 369/47.4 |
| 6,157,153 A * | 12/2000 | Uegami et al. ............. | 369/268 |
| 6,215,609 B1 * | 4/2001 | Yamashita et al. ........ | 360/73.03 |
| 6,351,287 B1 * | 2/2002 | Sakaegi et al. ............. | 369/116 |
| 6,614,738 B1 * | 9/2003 | Kim ........................... | 369/53.18 |

FOREIGN PATENT DOCUMENTS

| | | |
|---|---|---|
| JP | 03-065085 | 3/1991 |
| JP | 05198082 A * | 8/1993 |
| JP | 06-119708 | 4/1994 |
| JP | 06119708 A * | 4/1994 |
| JP | 07-296483 | 11/1995 |
| JP | 07-334950 | 12/1995 |

(Continued)

*Primary Examiner*—Hoa T. Nguyen
*Assistant Examiner*—Jorge L. Ortiz-Criado
(74) *Attorney, Agent, or Firm*—Greer, Burns & Crain, Ltd.

(57) ABSTRACT

There is disclosed an information storage apparatus in which even when a remaining power of a battery or a galvanic cell is low, an information recording medium can safely be removed. An MPU, a spindle motor driver, and a spindle motor constitute a decelerator for decelerating rotation of the information recording medium, and as a deceleration mode, a first deceleration mode with a relatively large power consumption and a second deceleration mode with a relatively small power consumption are used. The MPU monitors a voltage of a power supply line via a DSP, decelerates the rotation of the information recording medium in the first deceleration mode when the voltage exceeds a predetermined level, and decelerates the rotation of the information recording medium in the second deceleration mode when the voltage indicates the predetermined level or less.

9 Claims, 19 Drawing Sheets

FOREIGN PATENT DOCUMENTS

| | | |
|---|---|---|
| JP | 08-087818 | 4/1996 |
| JP | 09-034646 | 2/1997 |
| JP | 09-147470 | 6/1997 |
| JP | 09-213001 | 8/1997 |
| JP | 09-265710 | 10/1997 |
| JP | 09-306084 | 11/1997 |
| JP | 10-055595 | 2/1998 |
| JP | 10-188397 | 7/1998 |
| JP | 11-096649 | 4/1999 |
| JP | 2000-228053 | 8/2000 |

* cited by examiner

INFORMATION STORAGE APPARATUS

BACKGROUND OF THE INVENTION i) Field of the Invention

The present invention relates to an information storage apparatus for holding an information recording medium in a predetermined position and rotating the medium in a predetermined direction to perform at least an information reproduction with respect to the information recording medium.

ii) Description of Related Art

Information storage apparatuses such as a hard disk drive and a magnetooptic (MO) disk drive have heretofore been known, and in the information storage apparatus, a disk or card information recording medium is rotated by a spindle motor or the like at a high speed to access the information recording medium. The information storage apparatus is incorporated into a computer system as the information storage apparatus for a computer in many cases.

In recent years, information communication networks such as Internet have rapidly been developed, and with the development, portable computer systems such as a notebook-size personal computer have also been developed. When the aforementioned information storage apparatus is incorporated and utilized in the portable computer system, it is necessary to operate the information storage apparatus by a storage battery or a dry battery. Moreover, in order to lengthen life of the battery, and construct the portable computer system which can be utilized for a long time, development of the information storage apparatus with a little current consumption has strongly been demanded.

Additionally, when the information storage apparatus continues to be driven by the battery, an electric power stored in the battery is soon consumed, and it becomes impossible to continue driving the information storage apparatus. Therefore, the information storage apparatus or the computer system is provided with a function of issuing an alarm to a user when a remaining power of the battery runs short. For example, the information storage apparatus or the computer system monitors a voltage of the battery, and issues an alarm to let the user know that the remaining power runs short when the voltage indicates a predetermined level or less. A state in which the remaining power of the battery reaches a level requiring the alarm will hereinafter be referred to as a battery alarm state.

The user, notified of the battery alarm state, stops using the information storage apparatus and recovers the information recording medium from the apparatus in many cases. In order to recover the information recording medium from the information storage apparatus, it is necessary to stop rotating the information recording medium and take the medium out of the apparatus, but the stopping and taking of the medium are generally performed by the motor or the like. An operation of the information storage apparatus for stopping the rotation of the information recording medium and taking the medium out of the apparatus will hereinafter be referred to as an eject operation.

In a conventional information storage apparatus, a large power is consumed during stopping of the rotation of the information recording medium, a cartridge is incompletely ejected, in the course of the eject operation the power of the battery or the like runs out and the information storage apparatus stops in some cases. When the information storage apparatus stops in the course of the eject operation, there is a possibility that the recovering of the information recording medium becomes impossible and a possibility that breakage of the information recording medium is caused.

SUMMARY OF THE INVENTION

The present invention has been developed in consideration of the aforementioned circumstances, and an object thereof is to provide an information storage apparatus in which even when a remaining power of a battery is little, an information recording medium can safely be taken out.

To achieve the aforementioned object, according to the present invention there is provided a first information storage apparatus, operated by an electric power, for holding an information recording medium in a predetermined position and rotating the information recording medium in a predetermined direction to perform at least an information reproduction with respect to the information recording medium, said information storage apparatus comprising:

a recognition section for recognizing whether or not said electric power is a power of a predetermined level or more; and a decelerator for decelerating rotation of said information recording medium in a first deceleration mode which consumes a relatively large power, or decelerating the rotation of said information recording medium in a second deceleration mode which consumes a relatively small power, depending upon whether said recognition section recognizes that said electric power is the power of the predetermined level or more, or that said electric power is less than the predetermined level.

Here, the second deceleration mode may be provided with a smaller peak of power consumption than that of the first deceleration mode, a smaller average value of the power consumption than that of the first deceleration mode, or a smaller total amount of the power consumption than that of the first deceleration mode.

According to the first information storage apparatus of the present invention, when there is no allowance in the electric power, the second deceleration mode is selected and the electric power is saved. Therefore, in the first information storage apparatus, even when a remaining power of a battery is little, a probability that the apparatus stops in the course of an eject operation is low, and the information recording medium can safely be taken out.

Preferably the first information storage apparatus of the present invention, "further comprises a driver for driving the information recording medium in the predetermined direction, and the decelerator employs a deceleration mode for stopping the driving by the driver to decelerate the rotation of the information recording medium as the second deceleration mode."

Moreover, also preferably the first information storage apparatus of the present invention "further comprises a driver for driving the information recording medium in the predetermined direction; and a brake for applying a brake force to the information recording medium to decelerate the rotation, and the decelerator employs a deceleration mode for stopping the driving by the driver to decelerate the rotation of the information recording medium and subsequently operating the brake to further decelerate the rotation of the information recording medium as the second deceleration mode."

If the driving by the driver stops, unforced deceleration occurs by viscosity resistance of a grease or the like, air resistance, friction resistance of a bearing, and the like, and this deceleration requires no electric power for the deceleration. Therefore, the battery power can considerably be saved, and the taking-out of the information recording medium is performed more safely. Moreover, when forced deceleration is performed after the unforced deceleration, saving of the electric power and shortening of a processing time can both be realized and the apparatus is therefore useful for a user.

To achieve the aforementioned object, according to the present invention there is provided a second information storage apparatus for holding an information recording medium in a predetermined position and rotating the information recording medium in a predetermined direction to perform at least an information reproduction with respect to the information recording medium, the information storage apparatus comprising:

a brake for applying a brake force to the information recording medium to decelerate rotation; and an intermittent braking decelerator for intermittently operating the brake to decelerate the rotation of the information recording medium.

The battery has a property of suppressing the power consumption peak even with little remaining power and inhibiting a voltage drop to increase the total amount of power supply.

According to the second information storage apparatus of the present invention, by intermittently operating the brake, the power consumption peak is suppressed, and the information recording medium can safely be taken out even with little remaining power of the battery.

Moreover, to achieve the aforementioned object, according to the present invention there is provided a third information storage apparatus for holding an information recording medium in a predetermined position and rotating the information recording medium in a predetermined direction to perform at least an information reproduction with respect to the information recording medium, the information storage apparatus comprising:

a driver for receiving a signal indicating a rotation speed, and driving the information recording medium in the predetermined direction in such a manner that the information recording medium rotates at the rotation speed indicated by the signal; and a signal controlling decelerator for inputting a signal indicating a rotation speed lower than the rotation speed of the information recording medium to the driver to decelerate rotation of the information recording medium.

According to the third information storage apparatus of the present invention, the driver having received the signal indicative of the rotation speed lower than the rotation speed of the information recording medium inhibits the driving of the information recording medium to lower the rotation speed. This considerably saves the power consumption, and it is possible to safely take out the information recording medium even with little remaining power of the battery.

Additionally, with respect to the second and third information storage apparatuses of the present invention, only basic mode is described herein, but this simply avoids redundancy, and the second and third information storage apparatuses of the present invention includes not only the basic mode of the information storage apparatus but also various modes of information storage apparatuses corresponding to respective modes of the first information storage apparatus.

BRIEF DESCRIPTION OF THE DRAWINGS

FIG. 17 is a graph showing a time until a spindle motor and MO disk stop by friction resistance or the like.

DETAILED DESCRIPTION OF THE PREFERRED EMBODIMENTS

An embodiment of the present invention will be described hereinafter.

Figure 1:
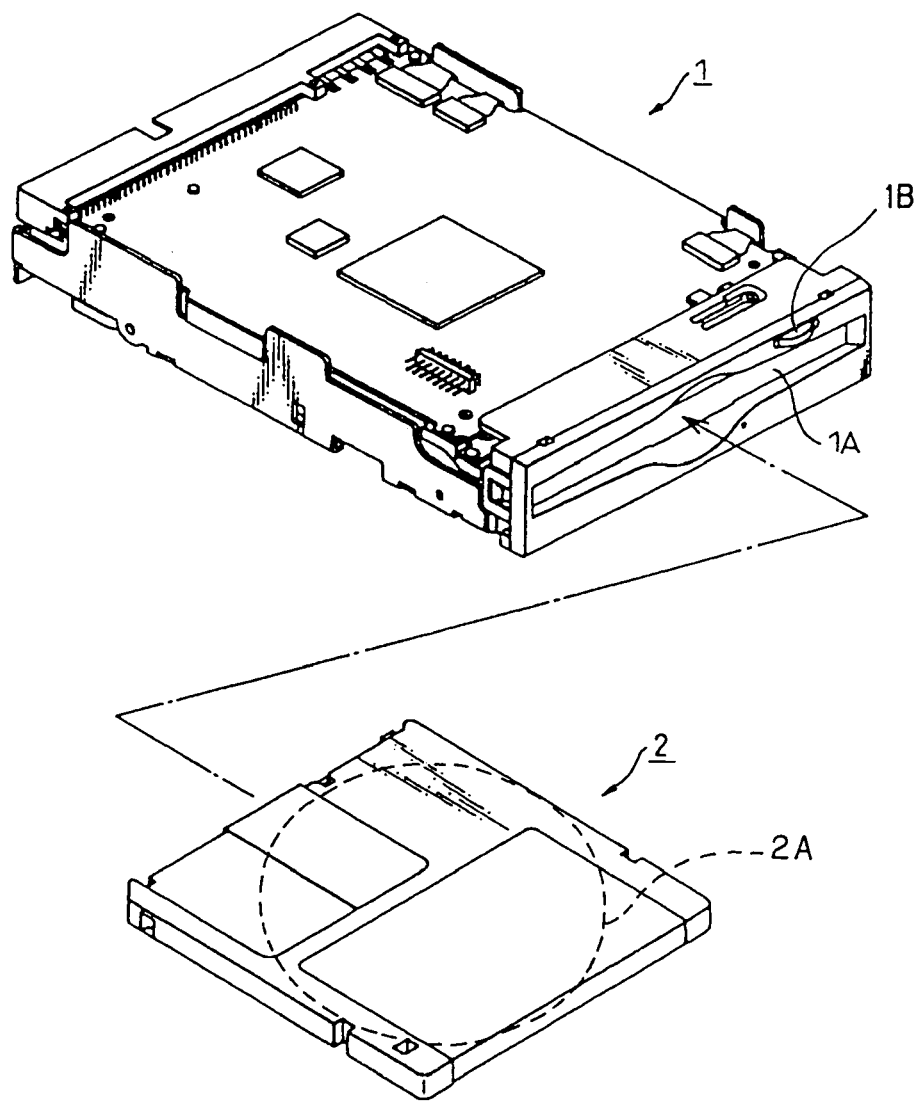
FIG. 1 is an appearance view showing a magnetooptic (MO) disk drive according to one embodiment of an information storage apparatus of the present invention.

FIG. 1 is an appearance view showing a magnetooptic (MO) disk drive as one embodiment of an information storage apparatus of the present invention.

An MO disk drive 1 shown herein is attached to a socket (not shown) which also serves as a cover, and connected to a personal computer or another host apparatus via the socket. Moreover, the MO disk drive 1 receives power supply from the host apparatus. A cartridge 2 is inserted into the MO disk drive 1 via an insertion port 1A.

The cartridge 2 incorporates a magnetooptic (MO) disk 2A as one example of an information recording medium referred to in the present invention, and the MO disk drive 1 rotates the MO disk 2A in a predetermined forward rotation direction to perform information recording and information reproduction with respect to the MO disk 2A. Moreover, in the MO disk drive 1 of the present embodiment, when an eject button 1B is pressed, an eject operation is executed, and a motor built in the MO disk drive 1 ejects the MO disk 2A together with the cartridge 2 out of the apparatus.

Figure 2:
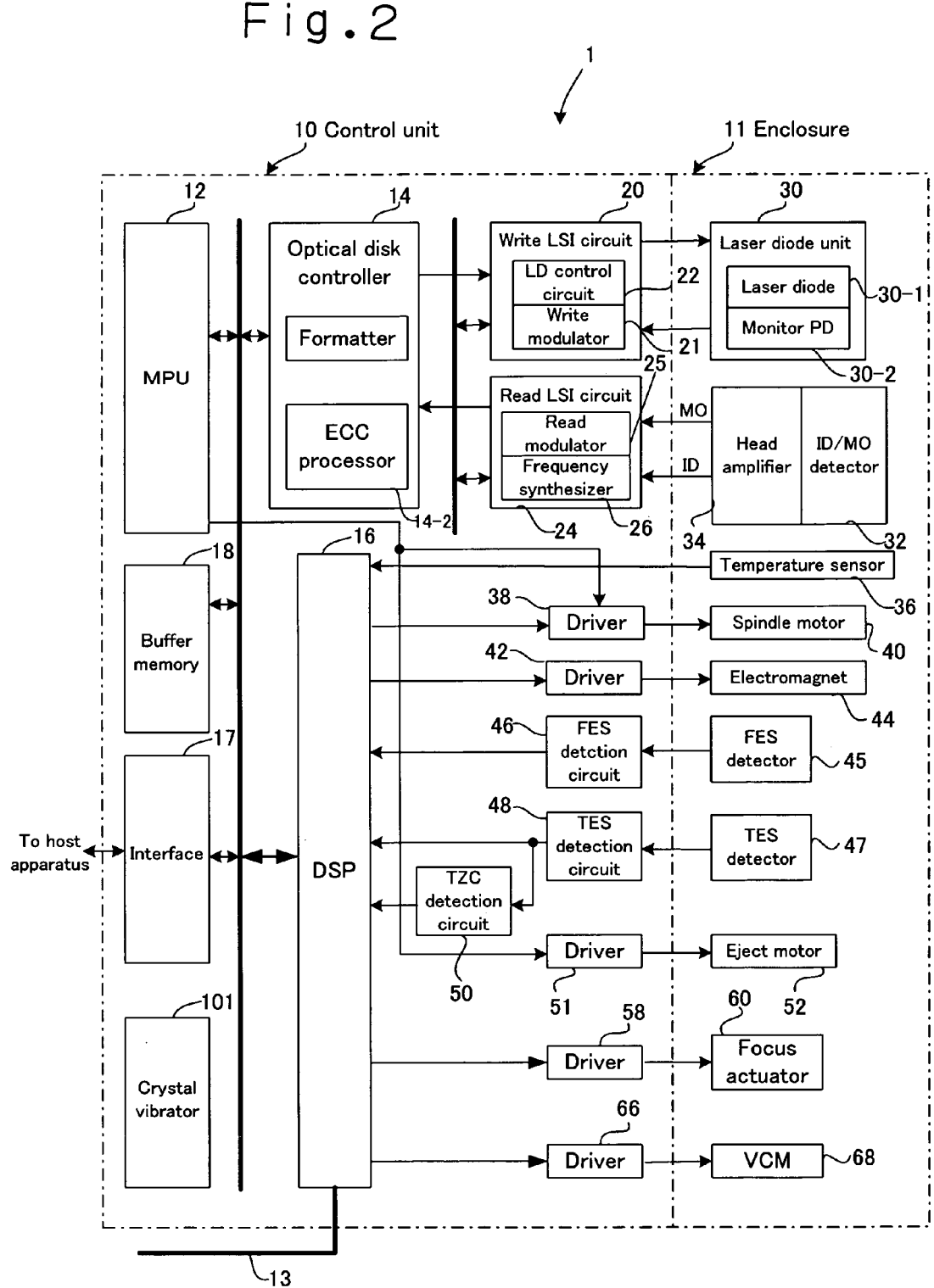
FIG. 2 is an internal constitution diagram of the MO disk drive.

FIG. 2 is an internal constitution diagram of the MO disk drive.

The MO disk drive 1 is, as shown in FIG. 1, largely divided into an enclosure 11, provided with the cartridge 2 shown in FIG. 1 inserted therein, for accessing the MO disk 2A in the cartridge 2, and a control unit 10 for controlling an operation of the enclosure 11.

The MO disk 2A of the cartridge 2 inserted in the enclosure 11 is held by a spindle motor 40. This spindle motor 40 is supplied with a drive current by a spindle motor driver 38 following a drive control signal emitted from a micro processor unit (MPU) 12, and performs rotation drive of the MO disk 2A in the forward rotation direction and forced stop of the MO disk 2A. Here, the MPU 12 carries a role as one example of a decelerator referred to in the present invention. Moreover, the spindle motor driver 38 and spindle motor 40 constitute one example of a driver referred to in the present invention, and the spindle motor driver 38 and spindle motor 40 also serve as one example of a brake referred to in the present invention.

As described above, the MO disk drive 1 receives the power supply from the host apparatus to operate, and the MPU 12 also serving as one example of a recognition section referred to in the present invention monitors a power level. Specifically, a voltage of a power supply line 13 for guiding the electric power supplied from the host apparatus to respective sections of the MO disk drive 1 is A/D converted by an A/D conversion circuit built in a digital signal processor (DSP) 16 and taken into the MPU 12, and the MPU 12 compares a voltage level with a predetermined standard level.

When the eject button 1B shown in FIG. 1 is pressed, the MPU 12 emits and inputs an eject signal to an eject motor driver 51, the eject motor driver 51 supplies the drive current to an eject motor 52, and the eject motor 52 ejects the MO disk 2A together with the cartridge 2 out of the MO disk drive 1.

Moreover, the enclosure 11 is provided with a laser diode unit 30, and during information reproduction, a laser diode 30_1 of the laser diode unit 30 emits a laser light with a predetermined strength. The laser light strength is controlled by a monitor photo diode 30_2 and laser diode control circuit 22. Furthermore, the MO disk 2A is irradiated with the laser light by a focus optical system (not shown), and a reflected light is generated in accordance with information recorded in the MO disk 2A. The reflected light is received by an ID/MO detector 32 and an ID signal and MO signal are detected. The ID and MO signals are amplified by a head amplifier 34, inputted to a read LSI circuit 24, demodulated by a read demodulation circuit 25 synchronized with a period signal generated by changing a period of a basic period signal of a crystal vibrator 101 by a frequency synthesizer 26, and converted to reproduction data. The reproduction data is checked for an error by an error correction code (ECC) processor 14_2 of an optical disk controller 14, and sent to the host apparatus via a buffer memory 18 and interface 17.

On the other hand, during information recording, the host apparatus sends recording data to the optical disk controller 14 via the buffer memory 18 and interface 17. After an error correction code is added by the error correction code (ECC) processor 14_2, the recording data is inputted to a write LSI circuit 20. Moreover, during formatting of the MO disk 2A, a formatter 14_1 of the optical disk controller 14 generates format data and inputs the data to the write LSI circuit 20. The recording data and format data are modulated by a write modulation circuit 21 of the write LSI circuit 20 and converted to a write signal, the write signal is inputted to the laser diode unit 30, and the laser diode 30_1 emits the laser light in response to the write signal.

Moreover, during information recording and formatting, the MPU 12 emits a magnetic field generation signal and inputs the signal to the digital signal processor (DSP) 16. The DSP 16 controls a magnetic head driver 42 in response to the magnetic field generation signal and an output signal of a temperature sensor 36, the magnetic head driver 42 supplies a current to a magnetic head electromagnet 44, and a recording magnetic field is generated on the MO disk 2A. By the recording magnetic field and the laser light in response to the write signal, the information is recorded in the MO disk 2A, or the MO disk 2A is formatted.

Furthermore, the MO disk drive 1 is provided with a voice coil motor 68, supplied with the drive current by a voice coil motor (VCM) driver 66, for moving an optical head with the focus optical system and laser diode unit 30 mounted thereon along the surface of the MO disk 2A. The voice coil motor (VCM) driver 66 is controlled by the DSP 16 in response to tracking error signal (TES) and tracking zero cross (TZC) detected from a detect signal obtained by a TES detector 47 by a TES detection circuit 48 and TZC detection circuit 50, and a seek signal emitted from the MPU 12.

Additionally, the MO disk drive 1 is also provided with a focus actuator 60, supplied with the drive current by a focus actuator driver 58, for driving the focus optical system. The focus actuator driver 58 is controlled by the DSP 16 in response to focus error signal (FES) detected from the detect signal obtained by a FES photodetector 45 by an FES detection circuit 46.

The spindle motor driver 38 and spindle motor 40 which serve both as one example of the driver referred to in the present invention and one example of the brake referred to in the present invention will next be described in detail.

Figure 3:
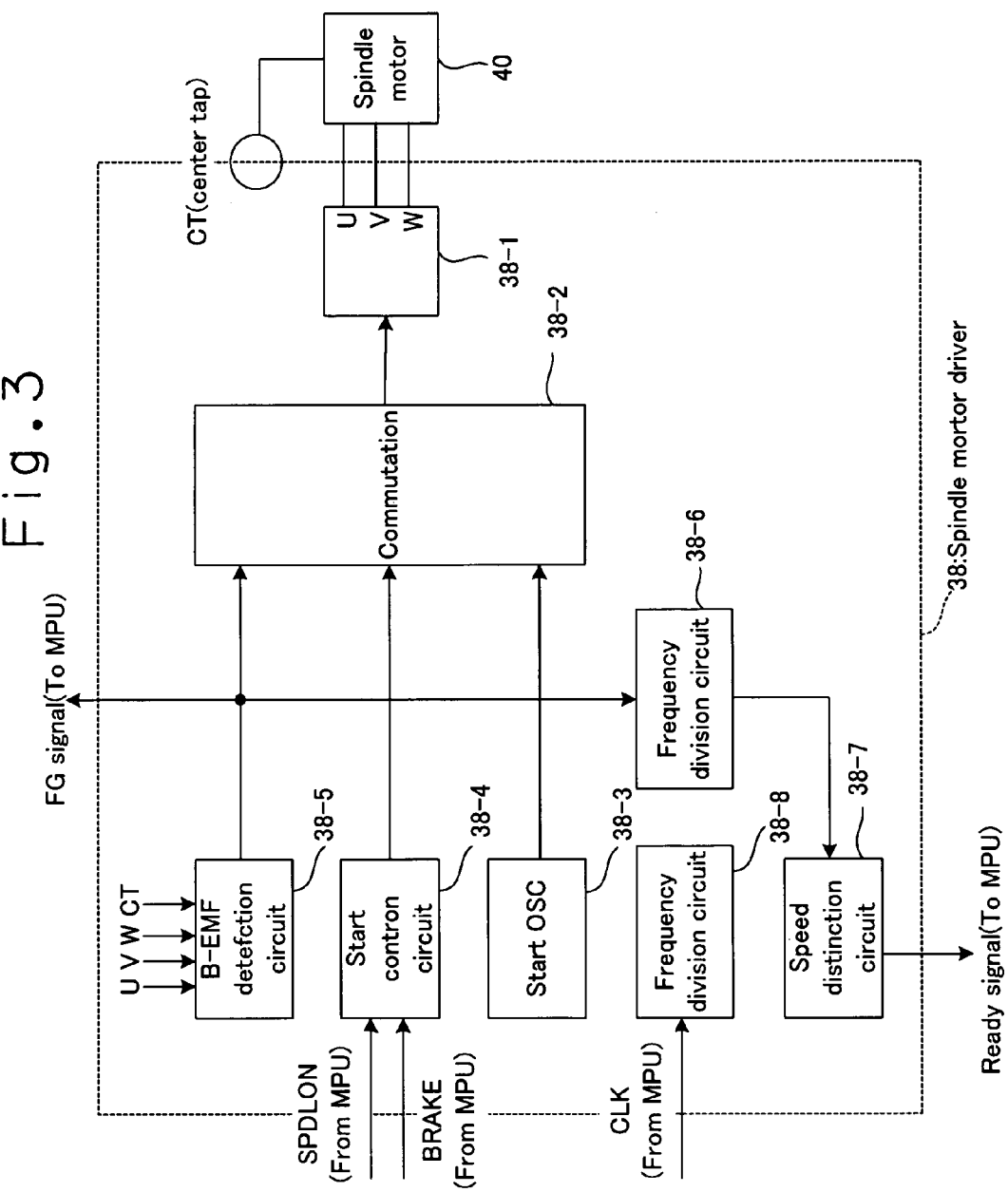
FIG. 3 is a constitution diagram of a spindle motor driver.

FIG. 3 is a constitution diagram of the spindle motor driver.

The spindle motor 40 is a motor which rotates when the drive current is successively supplied to three phases of U, V and W phases, and the spindle motor driver 38 is provided with a power source 38_1 for supplying the drive current to the U, V, and W phases. This power source 38_1 is also supplied with the electric power from the host apparatus via the power supply line.

Moreover, the spindle motor driver 38 is also provided with a commutation 38_2 for changing a supply phase to be supplied with the current among the U, V, and W phases in a circulating manner, and a start oscillator (OSC) 38_3 for generating a start period signal as a standard of a timing for changing the supply phase by the commutation 38_2. When the supply phase is changed by the spindle motor driver 38 in order of the forward rotation direction, the spindle motor 40 rotates/drives the MO disk 2A (see FIG. 1) in the forward rotation direction. Conversely, when the supply phase is changed in order of a backward rotation direction reverse to the forward rotation direction, the spindle motor 40 generates a drive force in the backward rotation direction, that is, a brake force to forcibly decelerate the MO disk 2A. Additionally, a reverse rotation preventing function is disposed, and the MO disk 2A is prevented from rotating in the backward rotation direction. Therefore, when the rotation continues to be decelerated by the brake force in the backward rotation direction to reach speed "0" the spindle motor 40 and MO disk 2A stop as they are.

Furthermore, the spindle motor driver 38 is also provided with a start control circuit 38_4 which receives the drive control signal from the MPU 12 (see FIG. 2) to control the commutation 38_2 and power source 38_1. To the start control circuit 38_4, a binary spindle on signal SPDLON and binary spindle brake signal BRAKE are inputted as the drive control signals. Subsequently, the start control circuit 38_4 operates/stops the power source 38_1 in accordance with an on/off state of the spindle on signal SPDLON, and instructs the commutation 38_2 to change the supply phase in the backward rotation direction or the forward rotation direction in accordance with the on/off state of the spindle brake signal BRAKE. When the power source 38_1 stops, the current supply to the spindle motor 40 by the power source 38_1 stops, and the drive force of the spindle motor 40 turns to "0" both in the forward rotation direction and backward rotation direction.

Moreover, the spindle motor 40 inputs back electromotive voltages of the U, V, and W phases, and a center tap voltage indicating a back electromotive voltage standard (0 V) to the spindle motor driver 38, and the back electromotive voltages and center tap voltage are inputted to a back electromotive voltage detection circuit 38_5. The back electromotive voltage detection circuit 38_5 outputs a period signal (FG signal) synchronous with the rotation of the spindle motor 40 based on the back electromotive voltages and center tap voltage.

Figure 4:
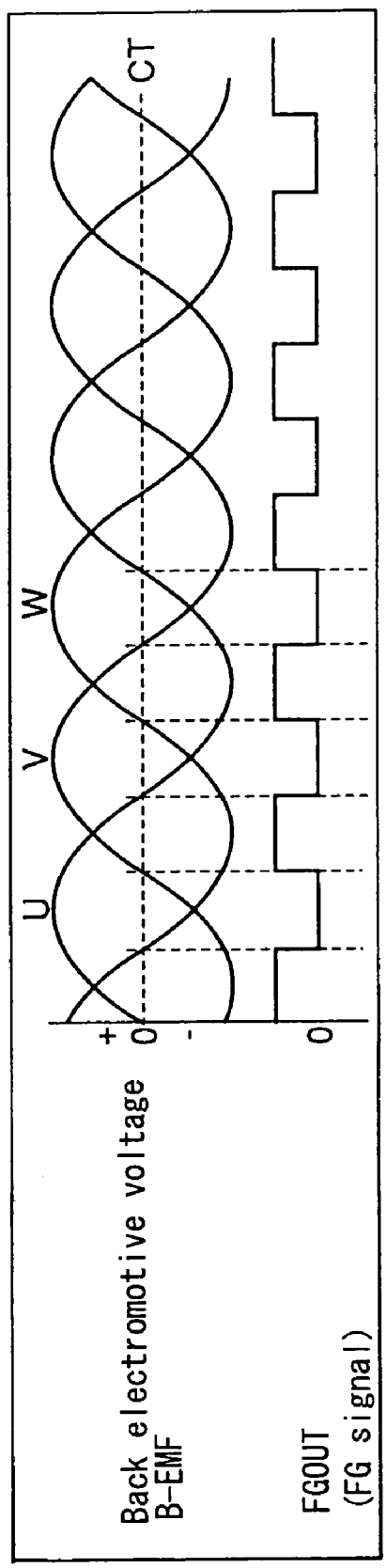
FIG. 4 is a graph showing an FG signal.

FIG. 4 is a graph showing the FG signal.

The abscissa of the graph indicates time, an upper part of the graph shows the back electromotive voltages of the U, V, and W phases while the center tap voltage is "0 V", and these back electromotive voltages form a sine waveform. Moreover, a lower part of the graph shows the FG signal, and the FG signal is a binary signal whose value is reversed every time the back electromotive voltages of the U, V, and W phases reach a zero cross.

Turning back to FIG. 3 the description will continue.

The FG signal outputted from the back electromotive voltage detection circuit 38_5 is inputted to the MPU, commutation 38_2, and frequency division circuit 38_6. The frequency division circuit 38_6 subjects the FG signal to frequency division and inputs the signal to a speed distinction circuit 38_7. Moreover, the MPU inputs a spindle clock signal CLK to another frequency division circuit 38_8, and the circuit subjects the spindle clock signal CLK to the frequency division and inputs the signal to the speed distinction circuit 38_7. A period of the spindle clock signal CLK represents a target value of the rotation speed of the spindle motor 40 and MO disk 2A. The speed distinction circuit 38_7 compares the signals inputted from two frequency division circuits 38_6, 38_8 with each other to distinguish the rotation speed of the spindle motor 40. Subsequently, the circuit outputs, to the MPU, a Ready signal indicating 'L' when the rotation speed is within a predetermined steady rotation speed range centering on the target value of the rotation speed indicated by the spindle clock signal CLK, and indicating 'H' when the rotation speed is outside the range.

Additionally, the commutation 38_2 is also provided with a function of adjusting a supply phase change speed to allow the rotation speed of the spindle motor 40 to approach the target value of the rotation speed indicated by the spindle clock signal CLK.

An operation of the MO disk drive 1 shown in FIGS. 1 and 2 will next be described with reference to a flowchart.

Figure 5:
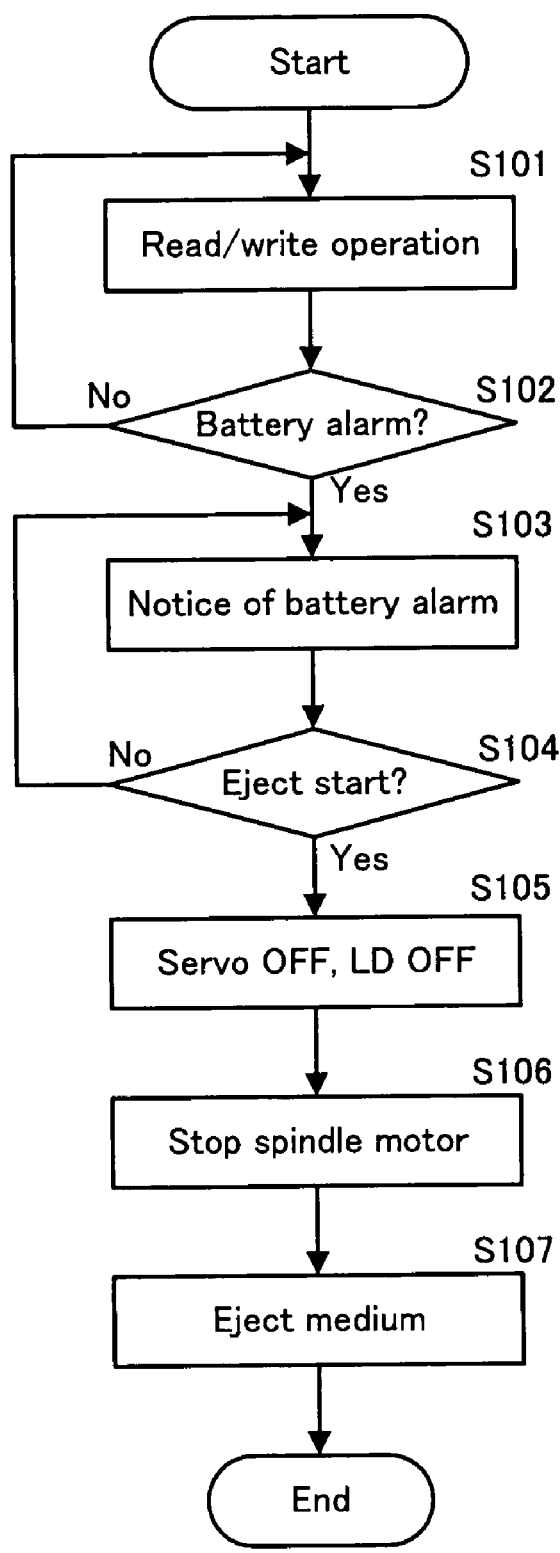
FIG. 5 is a flowchart showing an operation of the MO disk drive before/after a battery alarm state.

FIG. 5 is a flowchart showing the operation of the MO disk drive 1 before/after the battery alarm state.

The MO disk drive repeatedly executes a read/write operation to perform information recording and information reproduction with respect to the MO disk (step S101) as long as there is an allowance in a remaining power of the battery or the like (step S102: No). In a case in which the eject operation starts while the read/write operation is repeated in this manner, the MO disk decelerates and stops according to one example of a first deceleration mode referred to in the present invention.

Figure 6:
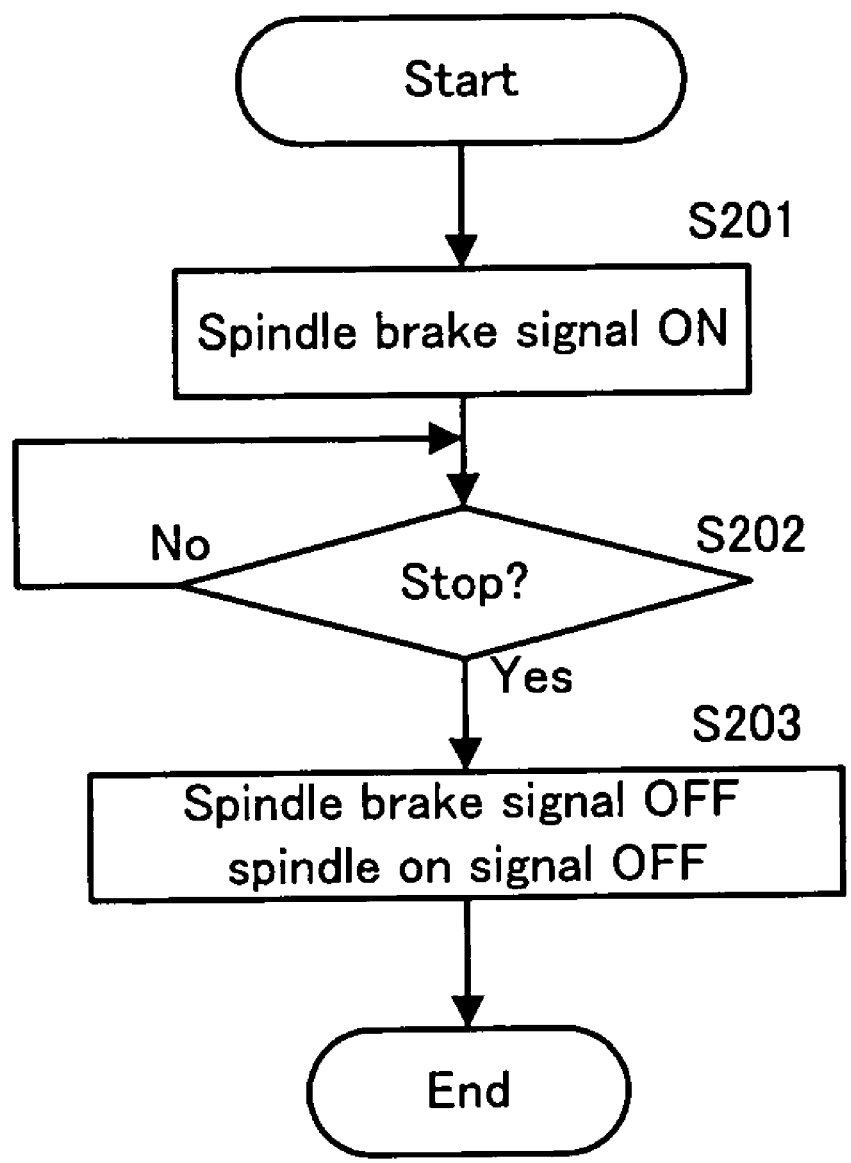
FIG. 6 is a flowchart showing a stop operation for stopping an MO disk according to one example of a first deceleration mode referred to in the present invention.
Figure 7:
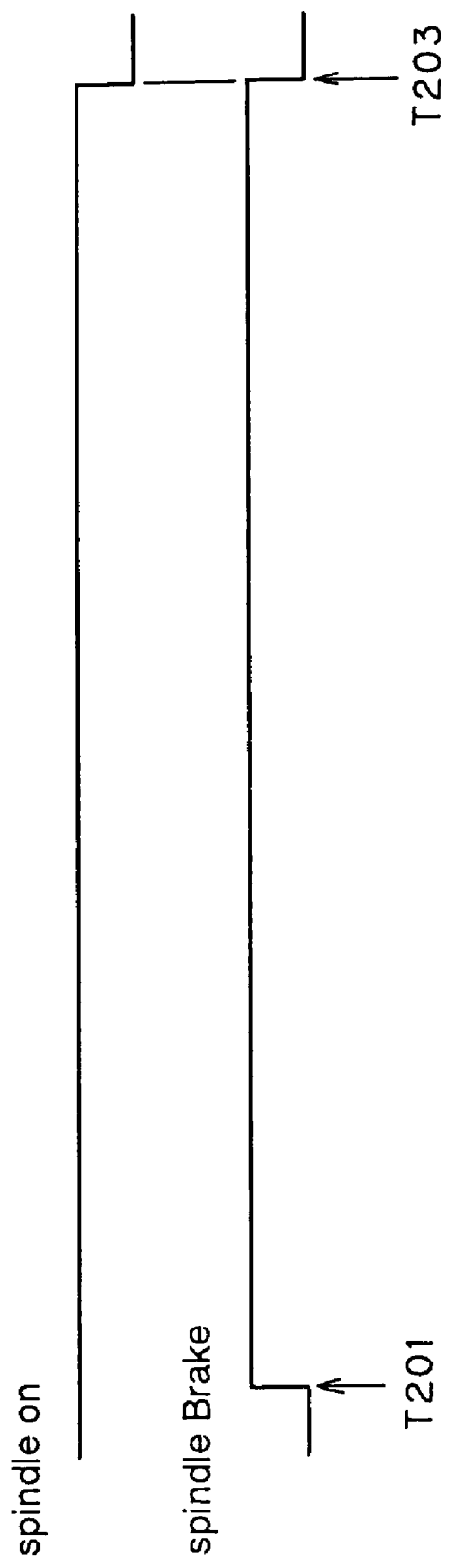
FIG. 7 is a time chart of a drive control signal in the stop operation for stopping the MO disk according to one example of the first deceleration mode referred to in the present invention.

FIG. 6 is a flowchart showing a stop operation for stopping the MO disk according to one example of the first deceleration mode referred to in the present invention, and FIG. 7 is a time chart of the drive control signal in the stop operation.

At the start of this stop operation (left end of FIG. 7), the spindle on signal (upper part of FIG. 7) is in an on state, the spindle brake signal (lower part of FIG. 7) is in an off state, and the MO disk is driven in the forward rotation direction. Subsequently, when the operation for stopping the MO disk starts, the spindle brake signal is changed to the on state (step S201 of FIG. 6, time T201 of FIG. 7), and the brake force acts on the MO disk in the backward rotation direction to perform forced deceleration. During deceleration of the MO disk, the on/off state of the FG signal is monitored, and it is judged based on the monitor result whether or not the MO disk stops (step S202 of FIG. 6). The on/off state of the FG signal changes in synchronization with the rotation of the MO disk. Therefore, when an on/off state change frequency of the FG signal becomes sufficiently low, it is judged that the MO disk has stopped. Subsequently, both the spindle on signal and the spindle brake signal are changed to the off state (step S203 of FIG. 6, time T203 of FIG. 7).

When the forced and continuous deceleration is performed, a large power is consumed. However, when there is an allowance in the remaining power of the battery, a processing time is preferentially reduced, and the forced and continuous deceleration is performed.

Turning back to FIG. 5 the description will continue.

When the remaining power decreases by repetition of the read/write operation, and the battery alarm state occurs (step S102: Yes), a user is notified of the battery alarm state (step S103). Thereafter, the user instructs the information recording and information reproduction to be stopped, and a standby state is retained until the user presses the eject button to instruct the start of the eject operation (step S104).

When the eject operation starts, a servo of the focus optical system stops, and the laser diode is turned off (step S105). Subsequently, a second deceleration mode described later and referred to in the present invention decelerates and stops the MO disk (step S106), the eject motor rotates, and the MO disk is ejected out of the apparatus (step S107).

A first example of the second deceleration mode referred to in the present invention will be described hereinafter.

Figure 8:
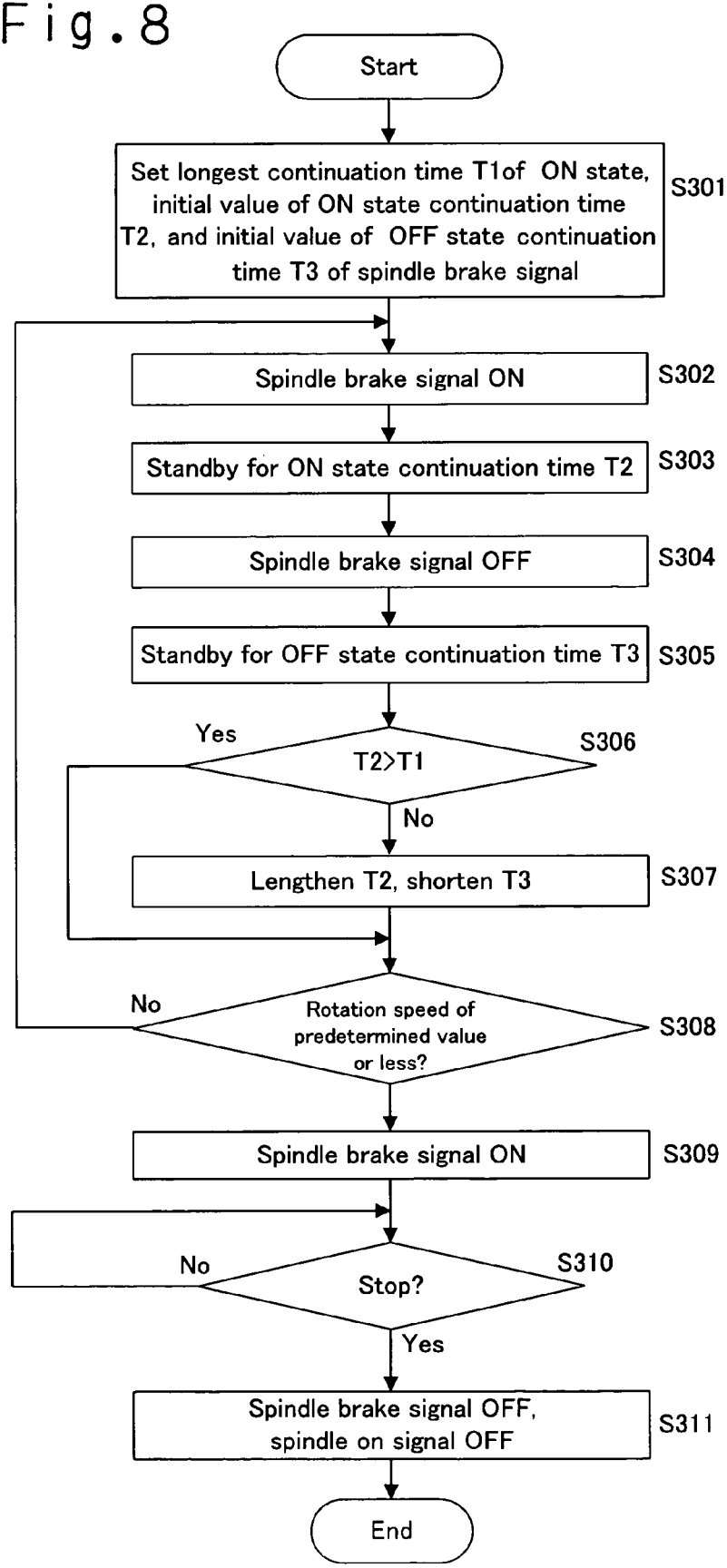
FIG. 8 is a flowchart showing the stop operation for stopping the MO disk according to a first example of a second deceleration mode referred to in the present invention.
Figure 9:
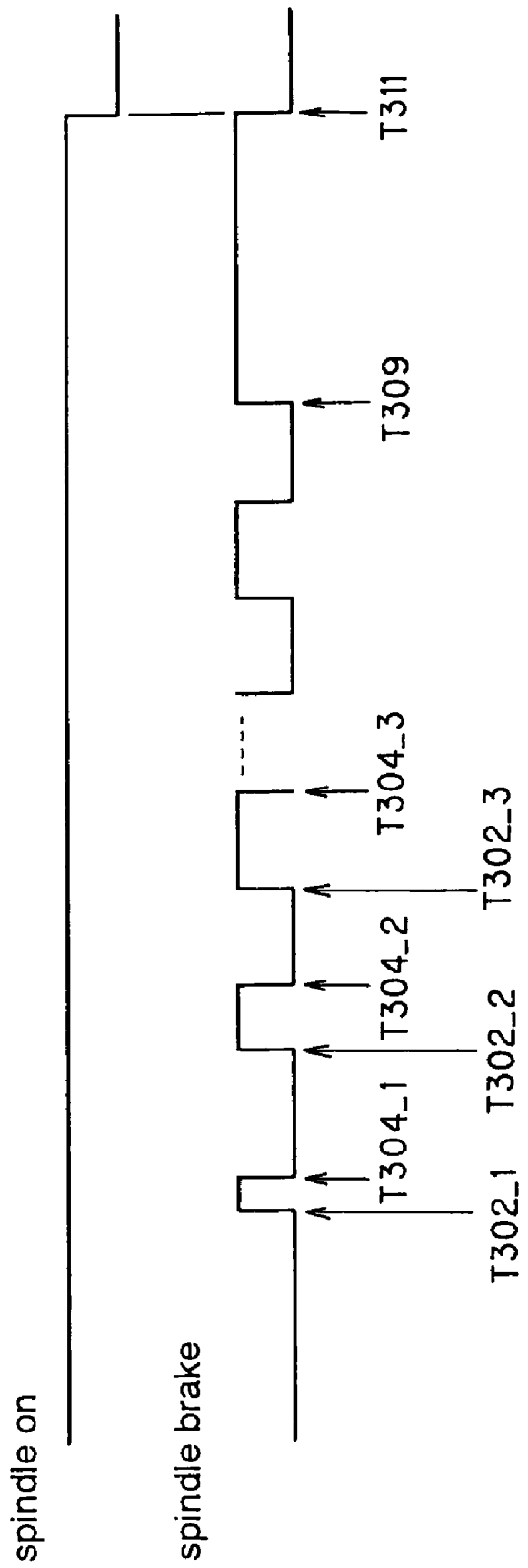
FIG. 9 is a time chart of the drive control signal in the stop operation for stopping the MO disk according to the first example of the second deceleration mode referred to in the present invention.

FIG. 8 is a flowchart showing the stop operation for stopping the MO disk according to the first example of the second deceleration mode referred to in the present invention, and FIG. 9 is a time chart of the drive control signal in the stop operation.

In this stop operation according to the first example of the second deceleration mode, the MPU generates the spindle brake signal in a pulse train form in order to intermittently execute the forced deceleration. Specifically, here the MPU corresponds to one example of an intermittent braking decelerator referred to in the present invention. Moreover, in the first example, a continuation time of the on state and continuation time of the off state in the spindle brake signal of the pulse train form change with elapse of time, respectively.

When this stop operation starts, a longest time T1 of the continuation time of the on state, initial value of a continuation time T2 of the on state, and initial value of a continuation time T3 of the off state in the spindle brake signal are set (step S301 of FIG. 8).

Subsequently, the spindle brake signal is changed to the on state (step S302 of FIG. 8, time T302_1 of FIG. 9), standby holds for the continuation time T2 of the on state (step S303 of FIG. 8), the spindle brake signal is changed to the off state (step S304 of FIG. 8, time T304_1 of FIG. 9), and standby holds for the continuation time T3 of the off state (step S305 of FIG. 8). This generates a pulse form of spindle brake signal, and the brake force in the backward rotation direction acts for the continuation time T2 of the on state.

Thereafter, when the continuation time T2 of the on state fails to exceed the longest time T1 (step S306 of FIG. 8: No), the continuation time T2 of the on state is lengthened, the continuation time T3 of the off state is shortened (step S307 of FIG. 8), and a proportion of the forced deceleration gradually increases. Subsequently, while the rotation speed of the spindle motor and MO disk exceeds a predetermined value (step S308 of FIG. 8: No), the steps S302 to S307 are repeated. As a result, the on/off state change of the spindle brake signal is repeated (time T302_2, . . . ; time T304_2, . . . of FIG. 9), the spindle brake signal of the pulse train form is generated, and the forced deceleration by the brake force in the backward rotation direction is repeatedly and intermittently performed.

With the high rotation speed of the spindle motor and MO disk, when the brake force in the backward rotation direction is continuously generated, the rotation speed is largely attenuated in a short time, but a power consumption peak is high, and a total amount of electric power obtained from the battery is small. On the other hand, when the brake force in the backward rotation direction is intermittently generated, time required for deceleration is long, but the power consumption peak is small, and the total amount of the power obtained from the battery is large. Additionally, with the low rotation speed, even when a method of generating the drive force differs, there is no large difference in the power consumption peak.

When the rotation speed of the spindle motor and MO disk reaches the predetermined value or less by the intermittent deceleration (step S308 of FIG. 8: Yes), to securely stop the MO disk, and the like, the spindle brake signal is changed to the on state (step S309 of FIG. 8, time T309 of FIG. 9), and the brake force continuously acts on the MO disk in the backward rotation direction. Similarly as described above, during the deceleration of the MO disk, the on/off state of the FG signal is monitored, and it is judged based on the monitor result whether or not the MO disk has stopped (step S310 of FIG. 9). When it is judged that the MO disk has stopped, both the spindle on signal and the spindle brake signal are changed to the off state (step S311 of FIG. 8, time T311 of FIG. 9). This ends the stop operation.

Additionally, the steps S306 and S307 can be omitted, and when these steps are omitted, the on/off state of the spindle brake signal is changed at a fixed period, and the spindle brake signal constituted of a period pulse train is generated.

Figure 10:
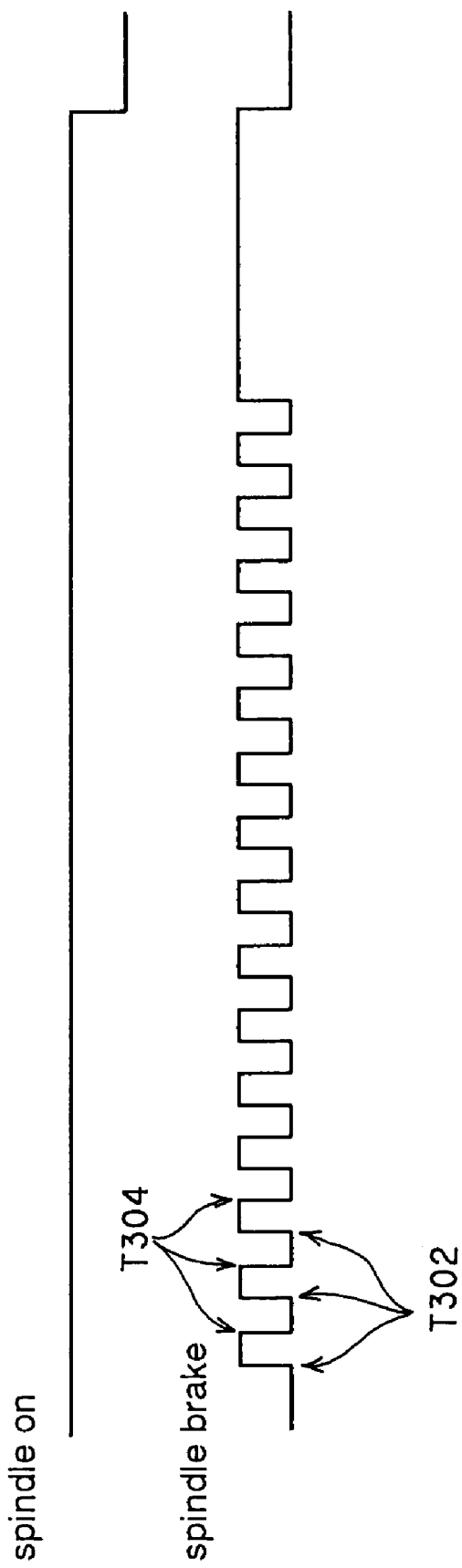
FIG. 10 is a time chart of the drive control signal in the stop operation for using a spindle brake signal constituted of a period pulse train to stop the MO disk.

FIG. 10 is a time chart of the drive control signal in the stop operation for using the spindle brake signal constituted of the period pulse train to stop the MO disk.

In this stop operation, the on/off state of the spindle brake signal is periodically changed (time T302, time T304) and forced deceleration is periodically executed. Since the subsequent operation is similar to the operation described with reference to FIGS. 8 and 9, the description thereof is omitted.

Here, a measurement result of a current consumption in the stop operation will be described.

Figure 11:
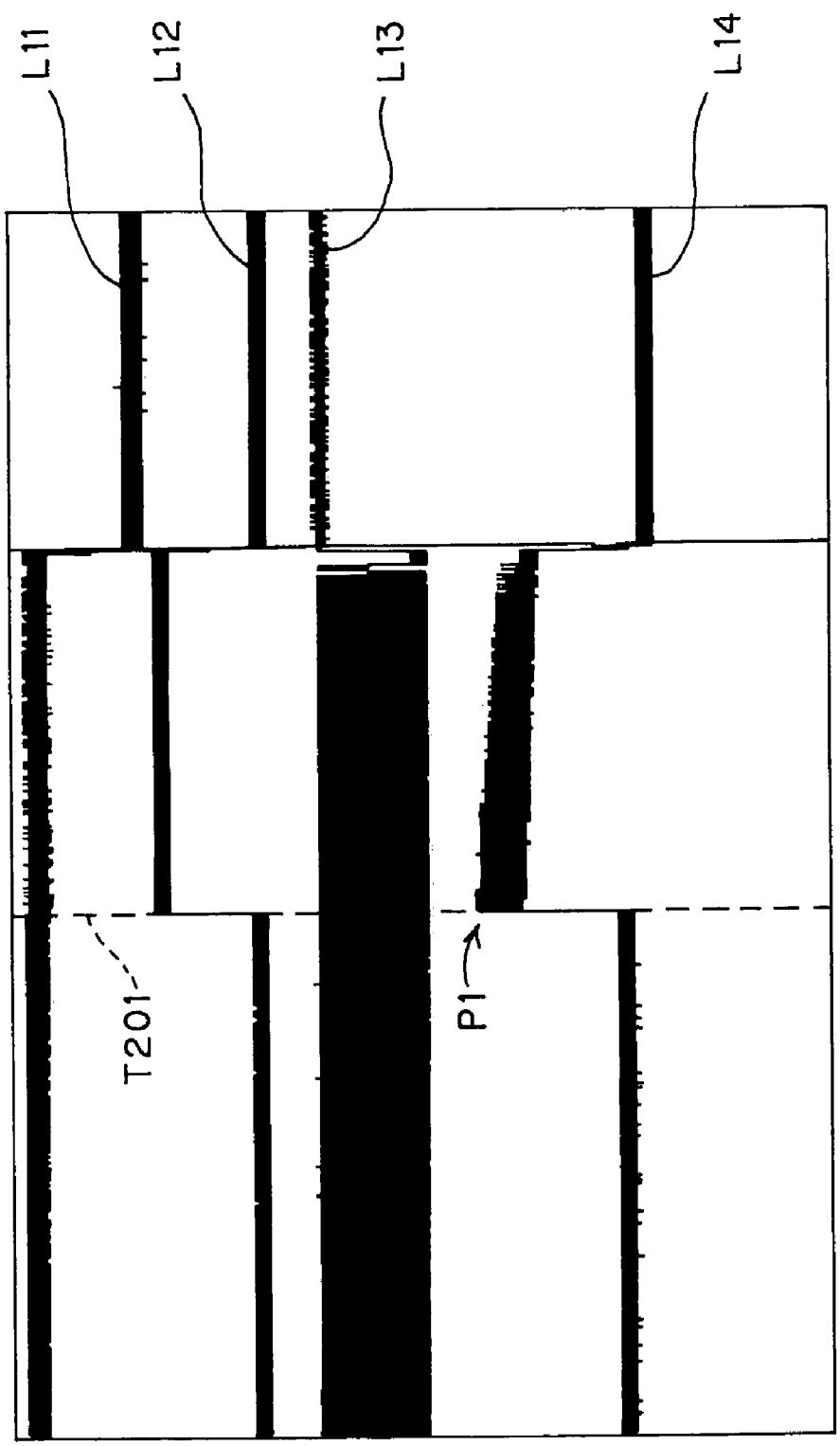
FIG. 11 is a graph showing a measurement result of current consumption in the stop operation shown in FIGS. 6 and 7.
Figure 12:
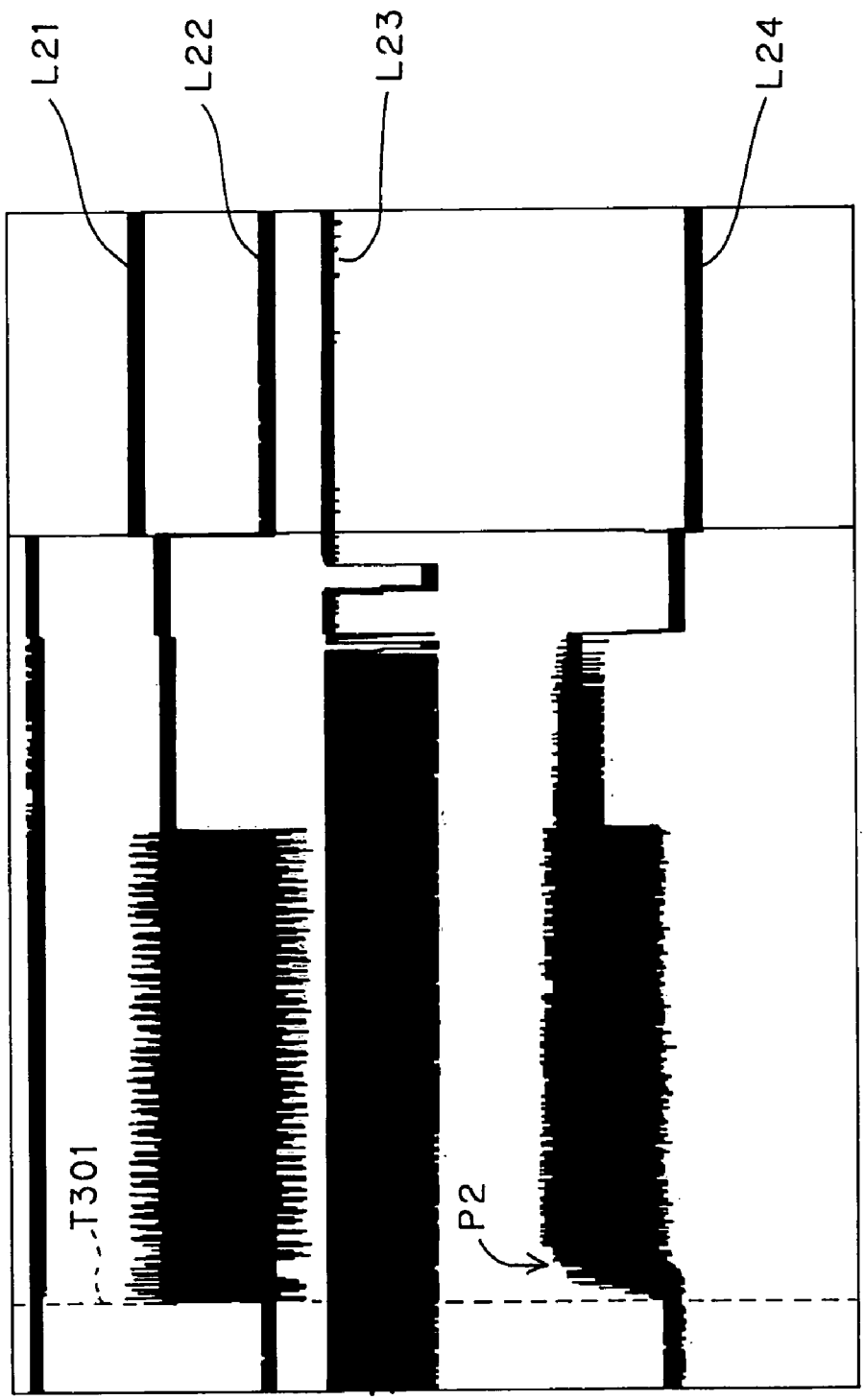
FIG. 12 is a graph showing the measurement result of the current consumption in the stop operation shown in FIGS. 8 and 9.

FIG. 11 is a graph showing the measurement result of the current consumption in the stop operation shown in FIGS. 6 and 7, and FIG. 12 is a graph showing the measurement result of the current consumption in the stop operation shown in FIGS. 8 and 9.

In these graphs, a first step on top shows a spindle on signal waveform L11, L21, a second step shows a spindle brake signal waveform L12, L22, a third step shows an FG signal waveform L13, L23, and a fourth step shows a current consumption waveform L14, L24.

In the graph of FIG. 11, the spindle brake signal waveform L12 is continuously in the on state from deceleration start time T201, and a steep rising P1 of a peak current occurs in the current consumption waveform L14. On the other hand, in the graph of FIG. 12, the spindle brake signal waveform L22 indicates a waveform of the pulse train form for a while from the deceleration start time T301. Moreover, the current consumption waveform L24 causes a moderate rising P2 and indicates the waveform of the pulse train form. As a result, the power consumption peak is suppressed and the average value of the power consumption is also suppressed to suppress consumption of the battery or the like. Therefore, the electric power for driving the eject motor is secured, and the MO disk is safely taken out.

Additionally, as the deceleration mode in the step S106 of FIG. 6, a second example of the second deceleration mode referred to in the present invention will be described hereinafter.

In the second example, the MPU changes the frequency of the spindle clock signal and decelerates the rotation of the spindle motor and MO disk. Specifically, when the second example is employed, the MPU corresponds to one example of a signal controlling decelerator referred to in the present invention.

Figure 13:
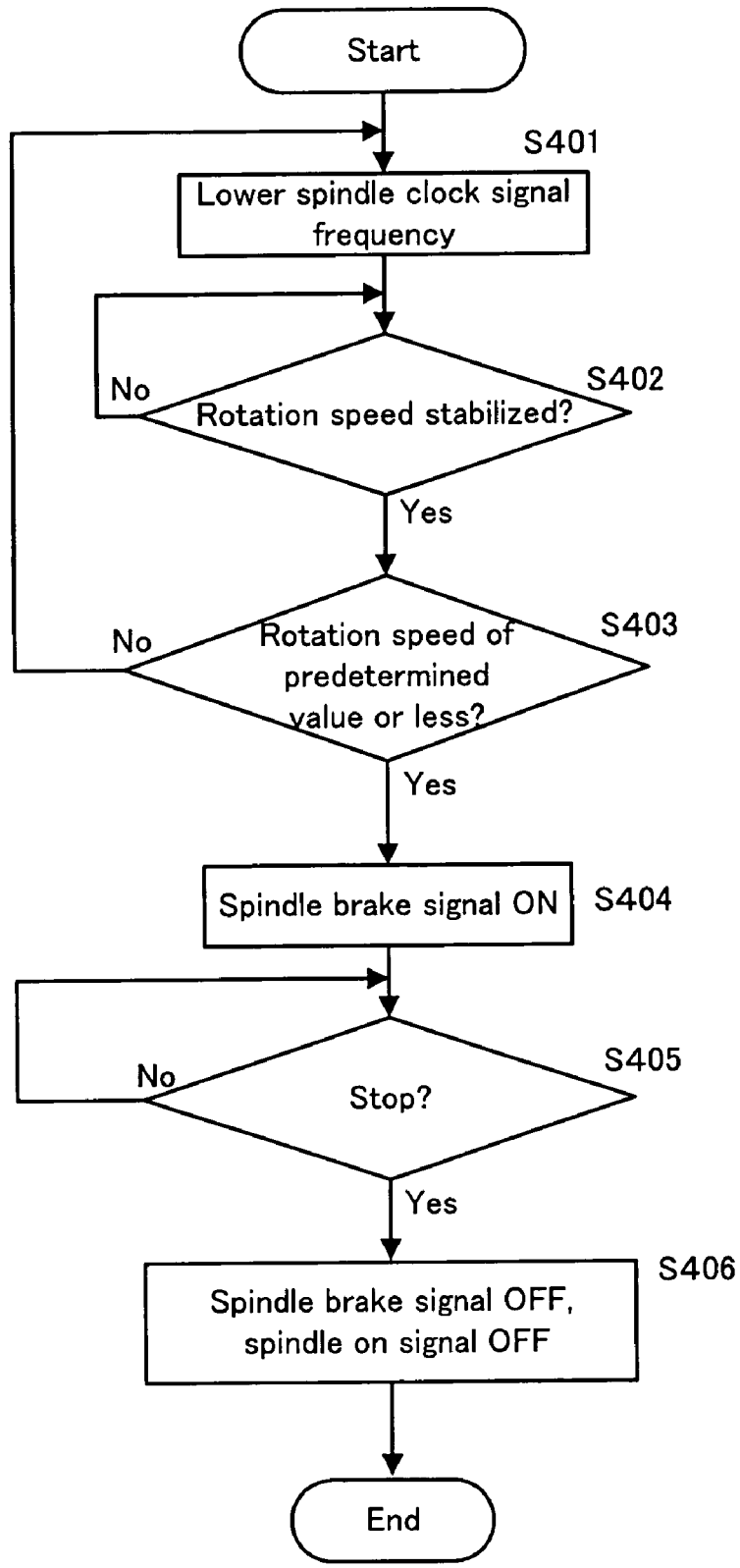
FIG. 13 is a flowchart showing the stop operation for stopping the MO disk according to a second example of the second deceleration mode referred to in the present invention.
Figure 14:
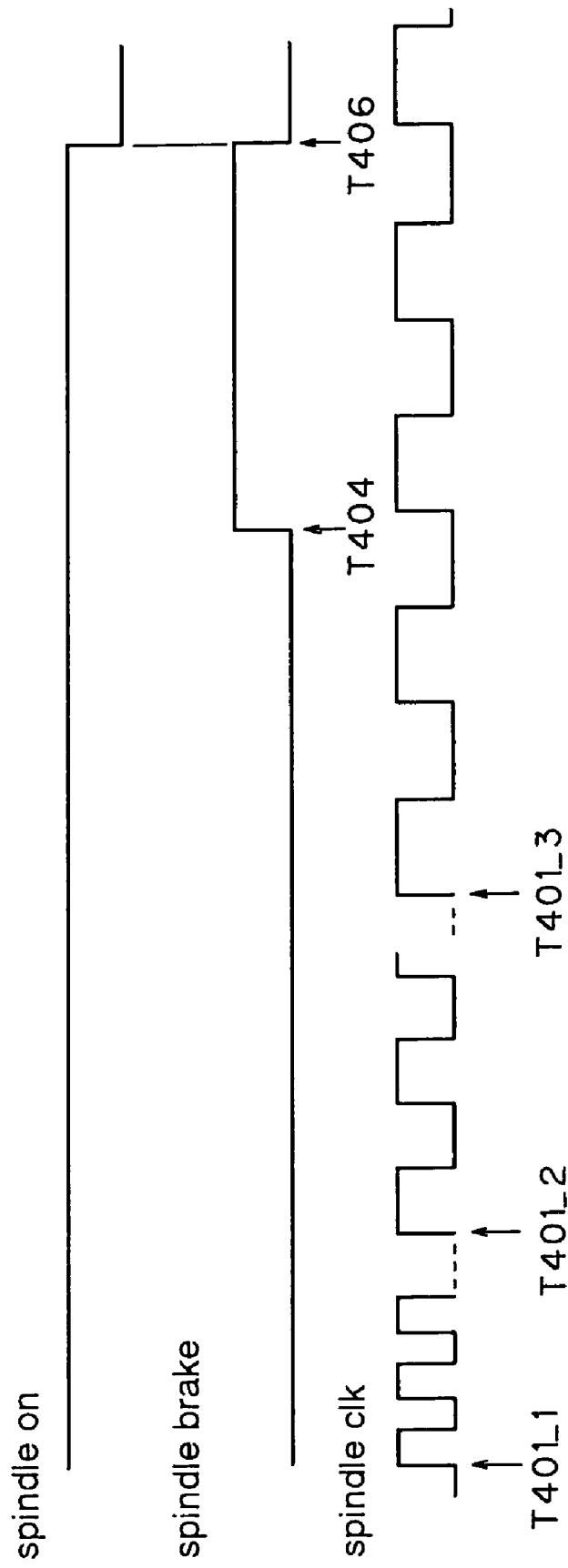
FIG. 14 is a time chart of the drive control signal and spindle clock signal in the stop operation for stopping the MO disk according to the second example of the second deceleration mode referred to in the present invention.

FIG. 13 is a flowchart showing the stop operation for stopping the MO disk according to the second example of the second deceleration mode referred to in the present invention, and FIG. 14 is a time chart of the drive control signal and spindle clock signal in the stop operation.

At the start of the stop operation, it is assumed that the rotation speed of the spindle motor and MO disk agrees with the rotation speed indicated by the spindle clock signal.

When the stop operation starts, the frequency of the spindle clock signal is lowered (step S401 of FIG. 13, time T401_1 of FIG. 14), and the spindle clock signal indicates the rotation speed lower than the rotation speed of the MO disk. As a result, the spindle motor driver lowers the drive force in the forward rotation direction, and the rotation speed of the MO disk or the like is attenuated to reach the rotation speed indicated by the spindle clock signal.

When the frequency of the spindle clock signal lowers in the step S401, the standby state holds until the rotation speed of the MO disk or the like is stabilized to reach the rotation speed indicated by the spindle clock signal (step S402 of FIG. 13).

In the standby state the Ready signal is monitored. As described above, the Ready signal indicates 'L' when the rotation speed of the MO disk or the like is within the predetermined steady rotation speed range centering on the rotation speed indicated by the spindle clock signal, and indicates 'H' when the rotation speed is outside the range. Therefore, immediately after the spindle clock signal frequency lowers, the MO disk rotation speed exceeds the rotation speed indicated by the spindle clock signal, and the Ready signal indicates 'H'. Thereafter, when the MO disk rotation speed is attenuated to reach the steady rotation speed range, the Ready signal indicates 'L', and it is judged that the MO disk rotation speed is stabilized (step S402 of FIG. 13: Yes).

While the rotation speed of the MO disk or the like exceeds a predetermined rotation speed suitable for the forced deceleration by the brake force in the backward rotation direction (step S403 of FIG. 13: No), the steps S401 and S402 are repeated, and the spindle clock signal frequency lowers in a stepwise manner (time T401_2 . . . of FIG. 14).

Thereafter, when the rotation speed of the MO disk or the like reaches the predetermined rotation speed or less (step S403 of FIG. 13: Yes), similarly as the first example of the second deceleration mode, in order to securely stop the MO disk, the spindle brake signal is changed to the on state (step S404 of FIG. 13, time T404 of FIG. 14), and the brake force is continuously applied to the MO disk in the backward rotation direction. Moreover, similarly as described above, it is judged based on the on/off state of the FG signal whether or not the MO disk has stopped (step S405 of FIG. 13). When it is judged that the disk has stopped, both the spindle on signal and the spindle brake signal are changed to the off state (step S406 of FIG. 13, time T406 of FIG. 14). This ends the stop operation.

Here, the measurement result of the current consumption in the stop operation will also be described.

Figure 15:
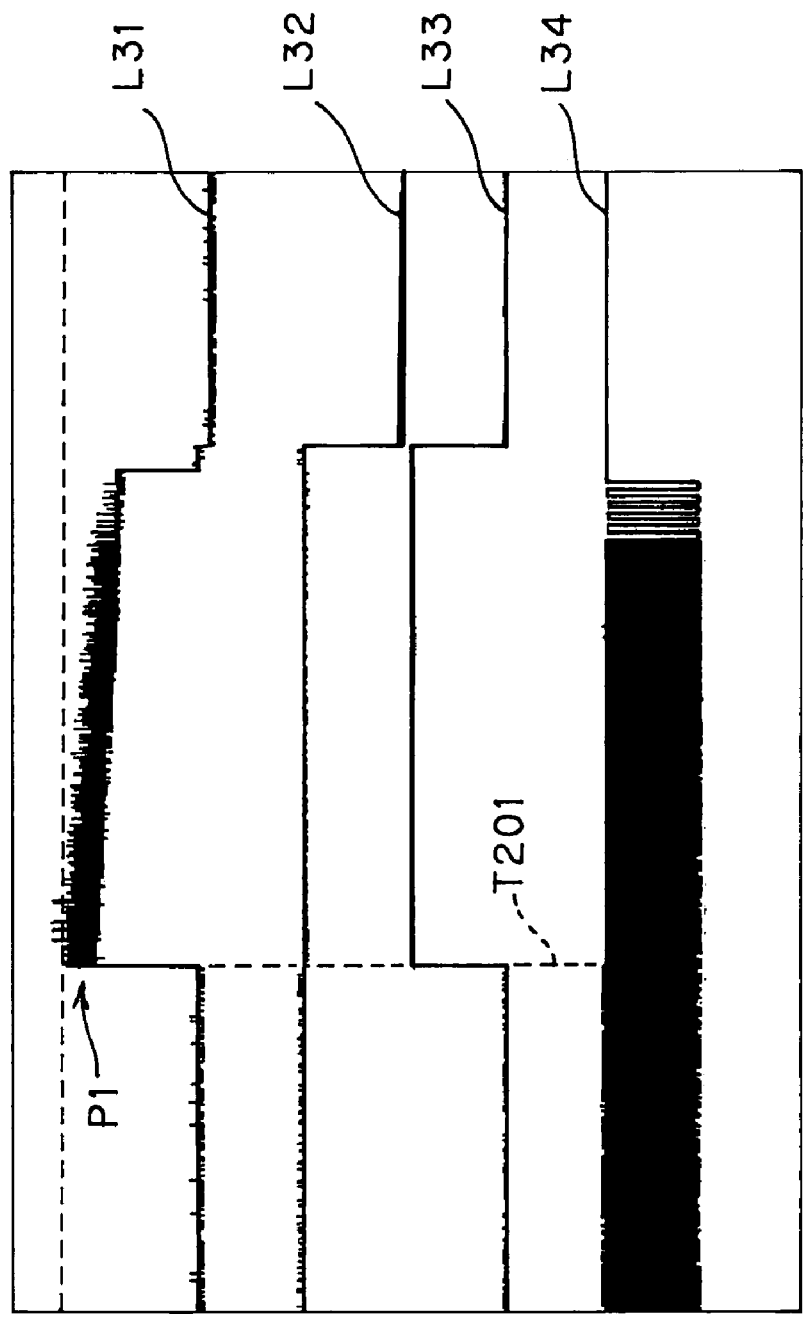
FIG. 15 is a graph showing again the measurement result of the current consumption in the stop operation shown in FIGS. 6 and 7.
Figure 16:
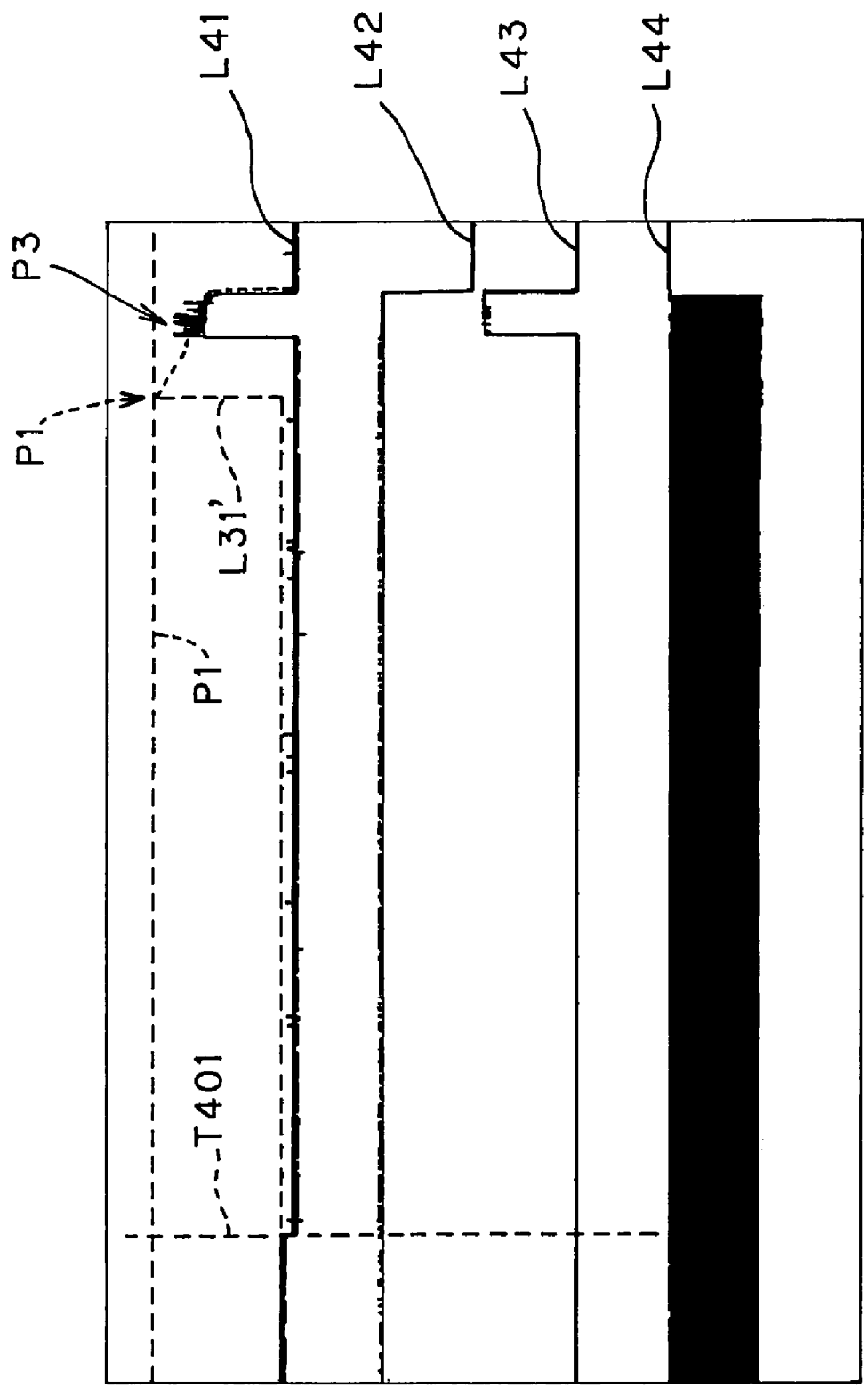
FIG. 16 is a graph showing the measurement result of the current consumption in the stop operation shown in FIGS. 13 and 14.

FIG. 15 is a graph showing again the measurement result of the current consumption in the stop operation shown in FIGS. 6 and 7, and FIG. 16 is a graph showing the measurement result of the current consumption in the stop operation shown in FIGS. 13 and 14.

In these graphs, a first step on top shows current consumption waveform L31, L41, a second step shows spindle on signal waveform L32, L42, a third step shows spindle brake signal waveform L33, L43, and a fourth step shows FG signal waveform L34, L44. Additionally, the abscissa of the graph of FIG. 16 is reduced in size to ⅕ with respect to the abscissa of the graph of FIG. 15, and the first step on top of the graph of FIG. 16 also indicates a waveform L31' corresponding to the current waveform L31 of the graph of FIG. 15 for comparison.

Similarly as the graph of FIG. 11, in the graph of FIG. 15, the spindle brake signal waveform L33 is continuously in the on state from the deceleration start time T201, and in the current consumption waveform L31 the steep rising P1 of the peak current occurs.

On the other hand, in the graph of FIG. 16, at a deceleration start time T401 a falling occurs in the current consumption waveform L41. Here, during the deceleration start a revolution number is 3600 rpm, and by lowering the spindle clock signal frequency the revolution number is lowered by 200 rpm each. When the revolution number reaches 1000 rpm or less, the spindle brake signal waveform L43 is in the on state, in the current consumption waveform L41 a rising P3 occurs, but a height of the rising P3 is lower than a height P1' of the steep rising P1.

Furthermore, with respect to a peak width of a current peak on and after the rising P1 of the waveform L31', the peak width of the current peak on and after the rising P2 of the waveform L41 is short, and the total amount of the power consumption indicated by the waveform L41 is obviously smaller than the total amount of the power consumption indicated by the waveform L31'.

In this manner, in the second example of the second deceleration mode referred to in the present invention, drastic saving of the power consumption can be realized, the electric power for driving the eject motor is secured and the MO disk can safely be ejected.

As the deceleration mode in the step S106 of FIG. 6, a third example of the second deceleration mode referred to in the present invention will be described hereinafter.

In the third example, the rotation of the MO disk and spindle motor is decelerated by viscosity resistance of a grease or the like, air resistance, friction resistance of a bearing, and the like in an unforced manner. Specifically, the driving of the MO disk by the spindle motor stops, the drive force turns to "0", both in the forward rotation direction and the backward rotation direction, and the MO disk and spindle motor rotate by inertia and decelerate under the friction resistance or the like.

Figure 17:
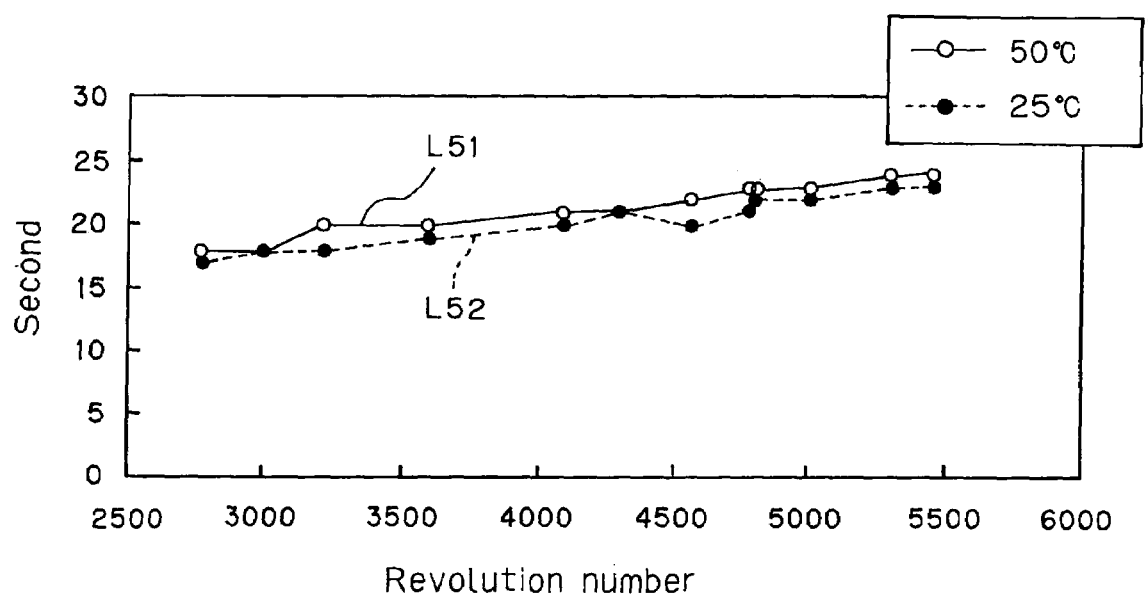

FIG. 17 is a graph showing a time until the spindle motor and MO disk stop by the friction resistance or the like.

The ordinate of the graph indicates the time required until the stop, and the abscissa indicates the revolution number in the beginning. Moreover, a line L51 with white circles attached thereto indicates the time required for the stop under environment of 50° C., and a line L52 with black circles attached thereto indicates the time required for the stop under environment of 25° C. In either environment, since the stop time of about 20 seconds is necessary. Therefore, it can be seen that for example, when rotation is performed by inertia for about 15 seconds, the deceleration is performed by the friction resistance to achieve a sufficiently low speed.

In the third example of the second deceleration mode referred to in the present invention, the deceleration is utilized.

Figure 18:
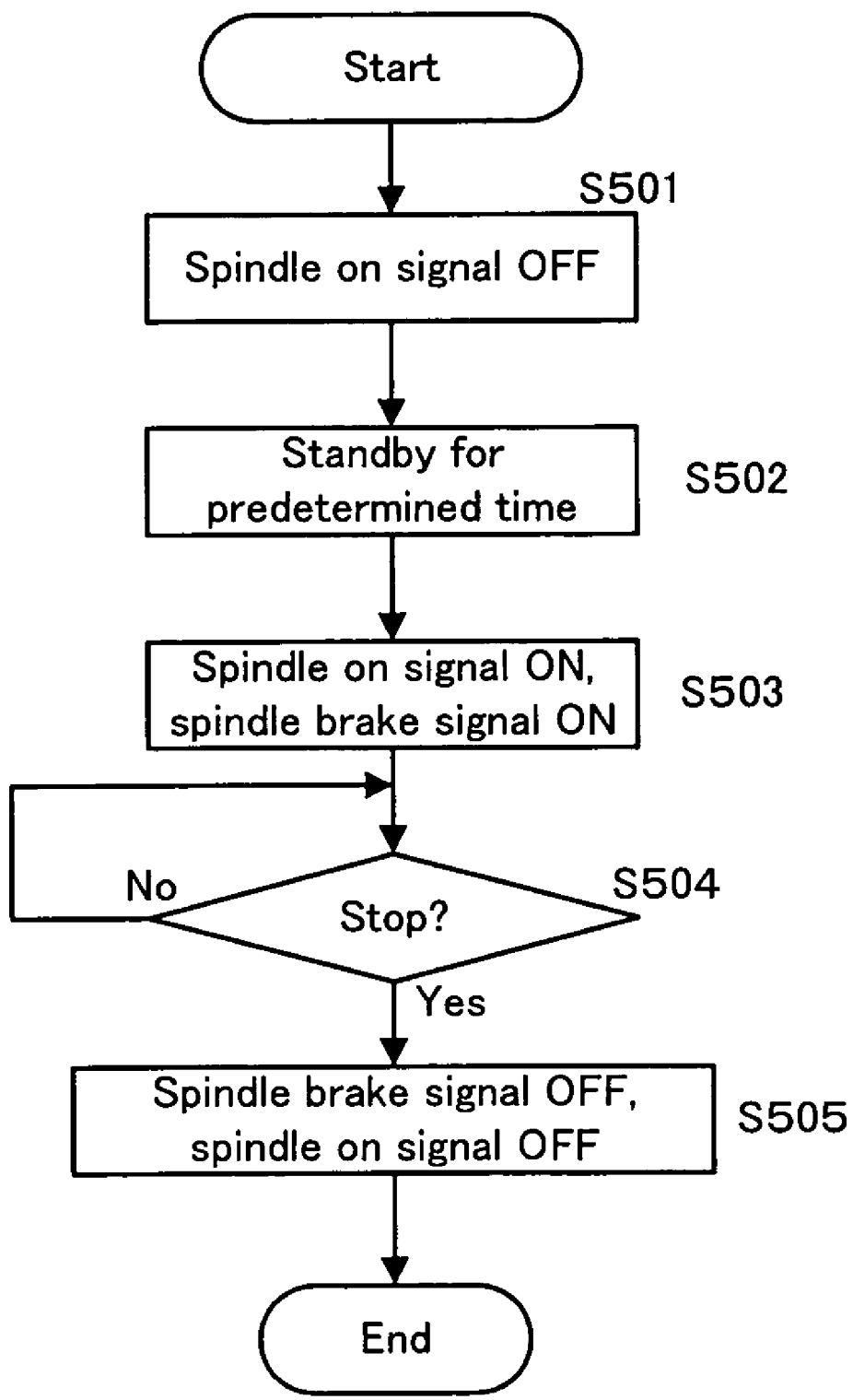
FIG. 18 is a flowchart showing the stop operation for stopping the MO disk according to a third example of the second deceleration mode referred to in the present invention.
Figure 19:
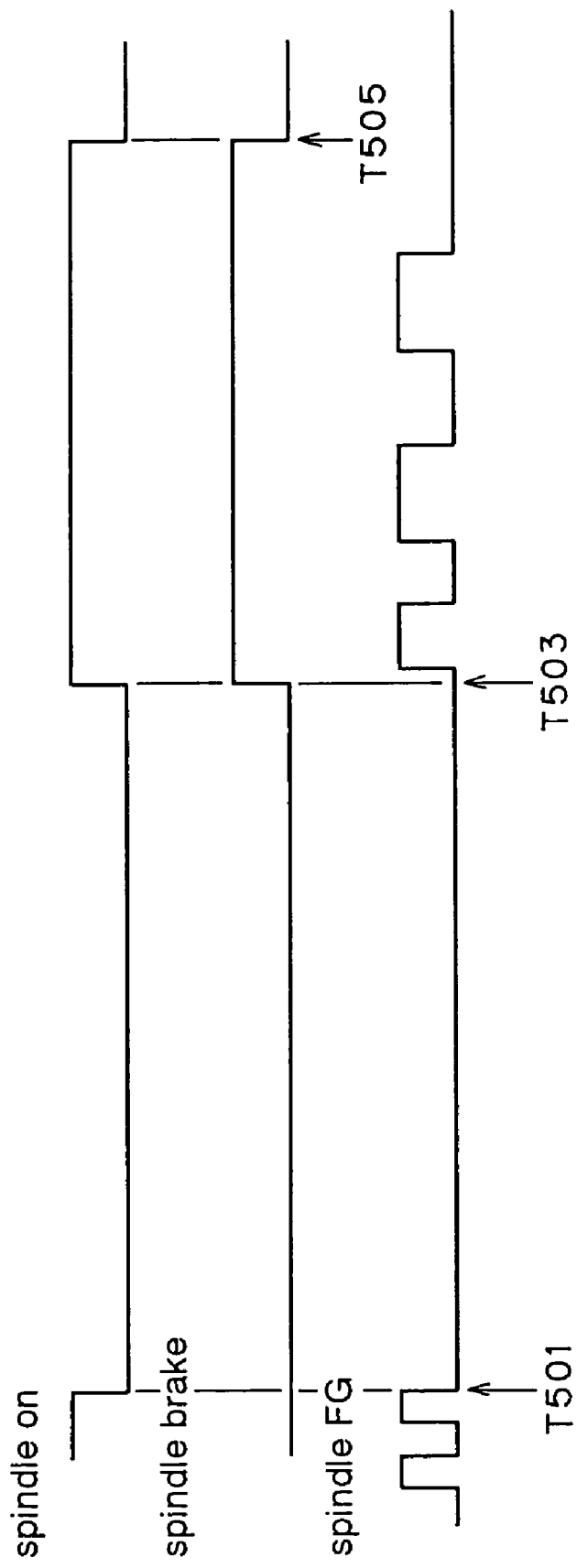
FIG. 19 is a time chart of the drive control signal and FG signal in the stop operation for stopping the MO disk according to the third example of the second deceleration mode referred to in the present invention.

FIG. 18 is a flowchart showing the stop operation for stopping the MO disk according to the third example of the second deceleration mode referred to in the present invention, and FIG. 19 is a time chart of the drive control signal and FG signal in the stop operation.

When the stop operation starts, the spindle on signal is changed to the off state, and rotation drive of the MO disk by the spindle motor stops (step S501 of FIG. 18, time T501 of FIG. 19). Thereafter, the standby state holds, for example, for 15 seconds, that is, for a predetermined time for which the MO disk is expected to sufficiently decelerate by the friction resistance or the like (step S502 of FIG. 18). In the standby state, the power consumption by the spindle motor is "0". Moreover, when the spindle on signal is in the off state, no FG signal is outputted, and it is impossible to confirm the rotation speed in the standby state. When the predetermined time elapses and the standby state ends, in order to securely stop the MO disk, both the spindle on signal and the spindle brake signal are changed to the on state (step S503 of FIG. 18, time T503 of FIG. 19), and the MO disk is forced to decelerate by the brake force in the backward rotation direction. Moreover, similarly as described above, it is judged based on the on/off state of the FG signal whether or not the MO disk has stopped (step S504 of FIG. 18). When it is judged that the disk has stopped, both the spindle on signal and the spindle brake signal are changed to the off state (step S505 of FIG. 18, time T505 of FIG. 19). This ends the stop operation.

Additionally, in the aforementioned standby state (step S502 of FIG. 18), the MO disk can stand by for a sufficient standby time to completely stop by the friction resistance. Moreover, in the standby case, when the standby time has expired, the stop operation ends, and the MO disk is ejected.

In the third example of the second deceleration mode referred to in the present invention, the drastic deceleration of the rotation of the MO disk is realized at the power consumption of "0" and therefore, more power consumption can be saved than in the second example.

Additionally, in the aforementioned embodiment, in order to recognize the level of the remaining power of the battery, the supply voltage is monitored and judged, but the recognition section referred to in the present invention may receive a state signal indicating a battery state from the host apparatus via the interface to recognize the remaining power level.

Moreover, in the embodiment, the electric power is supplied from the host apparatus, but the information storage apparatus of the present invention may be provided with its own battery.

Furthermore, the first deceleration mode referred to in the present invention is not limited to the deceleration mode described in the embodiment. Additionally, the information storage apparatus of the present invention may constantly employ the first or second example of the deceleration mode regardless of the remaining power amount of the battery or the like.

Moreover, in the embodiment, the magnetooptic disk of the optical recording system is used as the information recording medium, but the information recording medium referred to in the present invention may be magnetooptic disks of respective recording systems such as a magnetooptic recording system, a phase change recording system and a magnetic recording system, other disk recording mediums such as an optical disk and a magnetic disk, and a card recording medium.

As described above, according to the information storage apparatus of the present invention, the battery consumption for decelerating the rotation of the information recording medium can be reduced, and as a result, the electric power for ejecting the information recording medium out of the apparatus is secured and the information recording medium can safely be taken out.

What is claimed is:

1. An information storage apparatus, operated by electric power, for holding an information recording medium in a predetermined position and rotating the information recording medium in a predetermined direction to perform at least information reproduction with respect to the information recording medium, said information storage apparatus comprising:

a recognition section for recognizing whether or not said electric power is a power of a predetermined level or more; and a decelerator for decelerating rotation of said information recording medium in a first deceleration mode which consumes a relatively large amount of power, or decelerating the rotation of said information recording medium in a second deceleration mode which consumes a relatively small amount of power, depending upon whether said recognition section recognizes that said electric power is the power of the predetermined level or more, or that said electric power is less than the predetermined level.

2. The information storage apparatus according to claim 1, further comprising a driver for driving said information recording medium in said predetermined direction, wherein said decelerator employs, as said second deceleration mode, a deceleration mode for stopping the driving by said driver to decelerate the rotation of said information recording medium.

3. The information storage apparatus according to claim 1, further comprising:

a driver for driving said information recording medium in said predetermined direction; and a brake for applying a brake force to said information recording medium to decelerate the rotation, wherein said decelerator employs a deceleration mode for stopping the driving by said driver to decelerate the rotation of said information recording medium and subsequently operating said brake to further decelerate the rotation of the information recording medium as said second deceleration mode.

4. An information storage apparatus, operated by electric power, for holding an information recording medium in a predetermined position and rotating the information recording medium in a predetermined direction to perform at least information reproduction with respect to the information recording medium, said information storage apparatus comprising:

a recognition section for recognizing whether or not said electric power is a power of a predetermined level or more; and a decelerator for decelerating rotation of said information recording medium in a first deceleration mode which consumes a relatively large amount of power, or decelerating the rotation of said information recording medium in a second deceleration mode which consumes a relatively small amount of power, depending upon whether said recognition section recognizes that said electric power is the power of the predetermined level or more, or that said electric power is less than the predetermined level, further comprising a brake for applying a brake force to said information recording medium to decelerate the rotation, wherein said decelerator employs, as said second deceleration mode, a deceleration mode for intermittently operating said brake to decelerate the rotation of said information recording medium.

5. The information storage apparatus according to claim 4, wherein said second deceleration mode subsequently continuously operates the brake to further decelerate the rotation of the information recording medium, after intermittently operating said brake.

6. The information storage apparatus according to claim 1, further comprising a driver for receiving a signal indicating a rotation speed, and driving the information recording medium in said predetermined direction in such a manner that said information recording medium rotates at the rotation speed indicated by the signal, wherein said decelerator employs, as said second deceleration mode, a deceleration mode for inputting a signal indicating a rotation speed lower than the rotation speed of said information recording medium to said driver to decelerate the rotation of the information recording medium.

7. The information storage apparatus according to claim 1, further comprising a driver for receiving a signal indicating a rotation speed, and driving the information recording medium in said predetermined direction in such a manner that said information recording medium rotates at the rotation speed indicated by the signal, wherein said decelerator employs a deceleration mode for inputting a signal indicating a rotation speed lower than the rotation speed of said information recording medium to said driver to decelerate the rotation of the information recording medium and subsequently inputting a signal indicating a rotation speed further lower than the rotation speed indicated by the signal to said driver to further decelerate the rotation of said information recording medium as said second deceleration mode.

8. The information storage apparatus according to claim 1, further comprising:

a driver for receiving a signal indicating a rotation speed, and driving the information recording medium in said predetermined direction in such a manner that said information recording medium rotates at the rotation speed indicated by the signal; and a brake for applying a brake force to said information recording medium to decelerate the rotation, wherein said decelerator employs a deceleration mode for inputting a signal indicating a rotation speed lower than the rotation speed of said information recording medium to said driver to decelerate the rotation of the information recording medium and subsequently operating said brake to further decelerate the rotation of the information recording medium as said second deceleration mode.

9. An information storage apparatus for holding an information recording medium in a predetermined position and rotating the information recording medium in a predetermined direction to perform at least information reproduction with respect to the information recording medium, said information storage apparatus comprising:

a brake for applying brake force to said information recording medium to decelerate rotation; and an intermittent braking decelerator for intermittently operating said brake to decelerate the rotation of said information recording medium when a rotation speed of said medium exceeds a predetermined value;

wherein said intermittent braking decelerator intermittently operates said brake to decelerate the rotation of said information recording medium, and subsequently continuously operates said brake to further decelerate the rotation of the information recording medium.

\* \* \* \* \*